ROGER SANDIFORD, OF JOLIET, ILLINOIS.

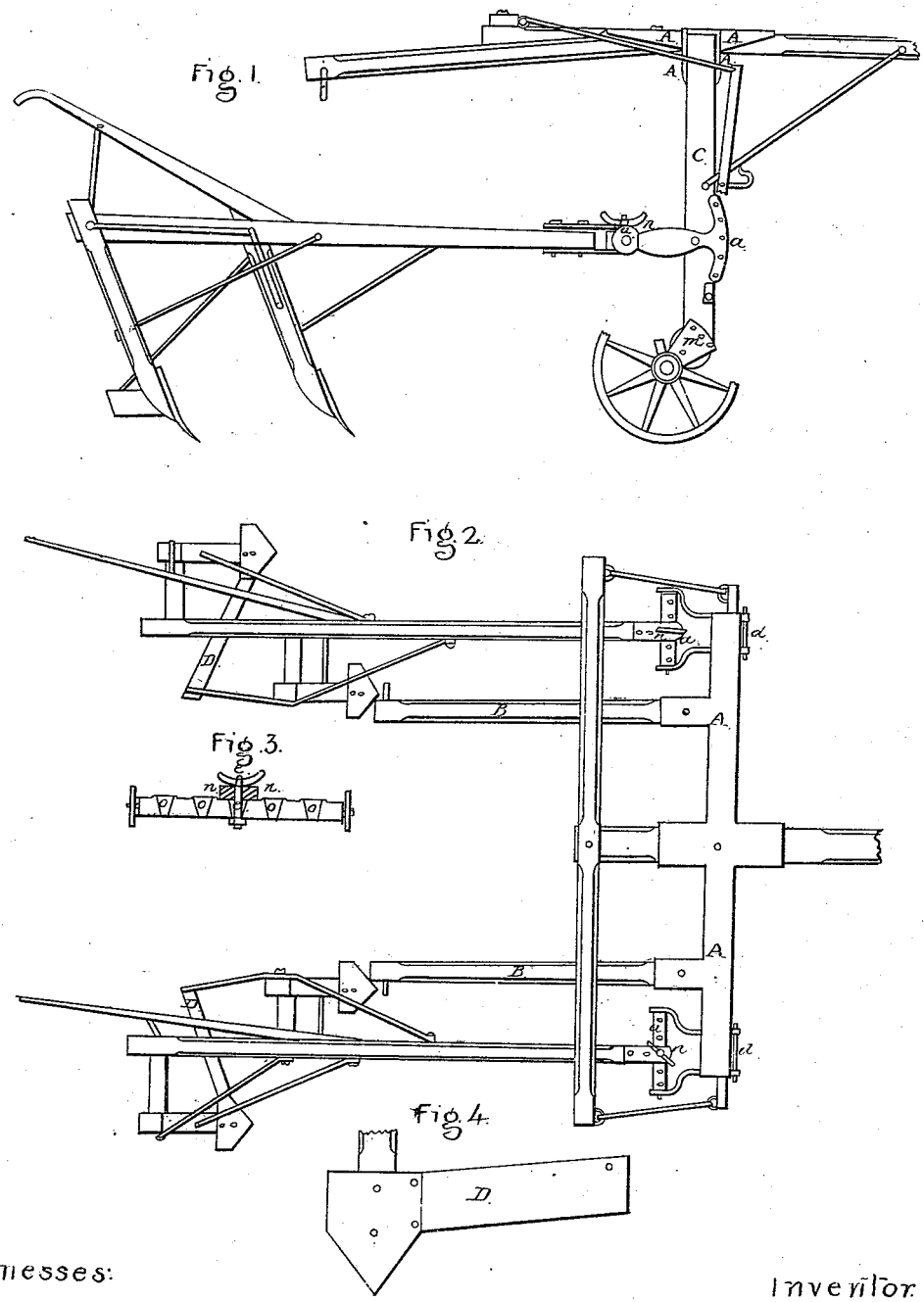

*Letters Patent No. 84,649, dated December 1, 1868.*

IMPROVEMENT IN CULTIVATORS.

The Schedule referred to in these Letters Patent and making part of the same.

Be it known that I, ROGER SANDIFORD, of the city of Joliet, in Will county, and State of Illinois, have invented a new and useful Improvement on a Cultivator; and I do hereby declare the following to be a full, clear, and exact description of the same, reference being had to the annexed drawings, making a part of this specification, in which—

Figure 1 is a side elevation;

Figure 2, a plane view on the top;

Figure 3, a centre longitudinal sectional view of the segmental coupling-clevis; and Figure 4, a perspective view of a single shovel, with its wing-attachment.

*a,* figs. 1 and 2, represents a segmental oscillating coupling-clevis, used to couple the plow-beams to the main frame C.

It will be seen that, by means of the pin *d,* fig. 2, and row of holes in the segment, as shown, the end of the plow-beam may be elevated or lowered, according to the oscillations of said clevis, to enable the plow to run deep or shallow.

The plow-beams may be set nearer together or farther apart, by the row of holes in the inner end of said clevis, as shown in figs. 2 and 3.

Fig. 3 more explicitly shows that part of said clevis to which the beams attach, the construction of which I wish to particularly indicate.

In other devices for the purpose, the pin *e* is continually being broken, by the violent wrenchings of the plow-beams. To obviate this difficulty, I construct the holes through said clevis, in the shape of a funnel, as shown at *o,* fig. 3, with an annular flange at the top, fitting into the counter-cap *n,* attached to the end of the plow-beams.

It will be seen that, by means of this device, the strain is almost entirely taken off the pin *e,* which rather performs the office of holding the parts firmly together, than a pin to pull by, and cannot break so easily as the ordinary devices in use.

*m,* fig. 1, represents a segmental axle, by means of which the frame of the machine may be elevated or lowered, to accommodate itself to the height of the corn or grain to be cultivated. This is done by means of a pin operating in the row of holes in the segment, which is obvious from the figure. This is quite necessary in cultivating corn when two or three feet high, for at that height the least blow will break it off.

Another important feature in my invention consists in the use of the cast cross-piece A. This saves the labor and cost of a number of tenons and mortises, when wood is used.

This cross-piece is cast with flanges on the under side, which receive the ends of the timbers to be fastened, and a single bolt holds each one in place, as is shown in fig. 2, making the construction quite simple and cheap.

Instead of extending the tongue back, to use as a support to the plows, when it is desired to move from one field to another without plowing, I use the two projecting arms B B. This is done so that the end of the tongue shall not obstruct the view of the row from the operator, is much less liable to break down the corn, and is much more convenient.

Fig. 4 shows a shovel, with a wing, D, attached, also shown in figs. 1 and 2. This wing is to act as a scraper, to hill up the row and level the ground at the same time it is being cultivated, generally to be used in going through the grain the last time. These wing-shovels can also be reversed, if desired, so as to throw the earth away from the corn, in going through the first time or two.

In using wings separately, without shovels, they only throw the lumps and dry earth to the row, while, by combining them with shovels, as in this case, they put only the fresh, loose earth next the row.

These wings may be attached to any of the shovels, or attached to the shin or standard, as may be desired.

Having thus described my invention,

What I claim as new, and desire to secure by Letters Patent, is as follows:

1. I claim the segmental oscillating coupling-clevis, shown in figs. 1 and 2, consisting of the parts *a d n,* and the part *o,* shown in fig. 3, when applied to a cultivator in the manner and for the purposes set forth.

2. I claim the metal cross-piece A, in combination with the post or frame *c* and supporting-arms B B, constructed and arranged in the manner described.

ROGER SANDIFORD.

Witnesses:
 THOS. H. HUTCHINS,
 HENRY LOWE.